United States Patent [19]

Dieffenbach

[11] Patent Number: 4,652,961
[45] Date of Patent: Mar. 24, 1987

[54] MICRO-FLOPPY DISKETTE WITH INNER CONTAINMENT SYSTEM

[75] Inventor: Harry N. Dieffenbach, Fremont, Calif.

[73] Assignee: Dysan Corporation, Santa Clara, Calif.

[21] Appl. No.: 655,120

[22] Filed: Sep. 27, 1984

[51] Int. Cl.$^4$ .................. G11B 25/04; G11B 23/02
[52] U.S. Cl. .................................. 360/133; 206/444
[58] Field of Search .................. 360/133, 131–132, 360/128, 97–99, 86, 130.34; 206/444

[56] References Cited

U.S. PATENT DOCUMENTS 4,272,795  6/1981  Davis, Jr. et al. .............. 360/133 X
4,471,397  9/1984  Cloutier ............................. 360/133

FOREIGN PATENT DOCUMENTS 0003756  1/1984  Japan ................................ 360/133

*Primary Examiner*—Stuart N. Hecker
*Assistant Examiner*—David J. Severin
*Attorney, Agent, or Firm*—Townsend & Townsend

[57] ABSTRACT

A micro-floppy diskette has an outer relatively rigid jacket with a pair of aligned transducer access apertures; an inner containment cup assembly rotatably received within the jacket, the cup assembly including a pair of flexible cups sealed about the periphery and a pair of flexible annular wiping elements secured to the inner surface of each cup member; and a flexible recording disk rotatably received within the cup assembly. The cup members and wiping elements have mutually aligned cut-out portions which expose the disk recording band through the jacket access apertures when the cup assembly is rotated to an open position. When the cup is rotated to a closed position, the recording disk is shielded from ambient by solid portions of the jacket. One of the cup members has a protruding lug arranged in sliding contact with an inner surface of the jacket to bias the disk to a disk operating plane when the cup assembly is in the open position. An inner surface of the jacket has a detent groove which receives the lug when the cup assembly is in the closed position to provide a positive detent shutter function. An optional tension spring normally biases the cup assembly to the closed position.

10 Claims, 8 Drawing Figures

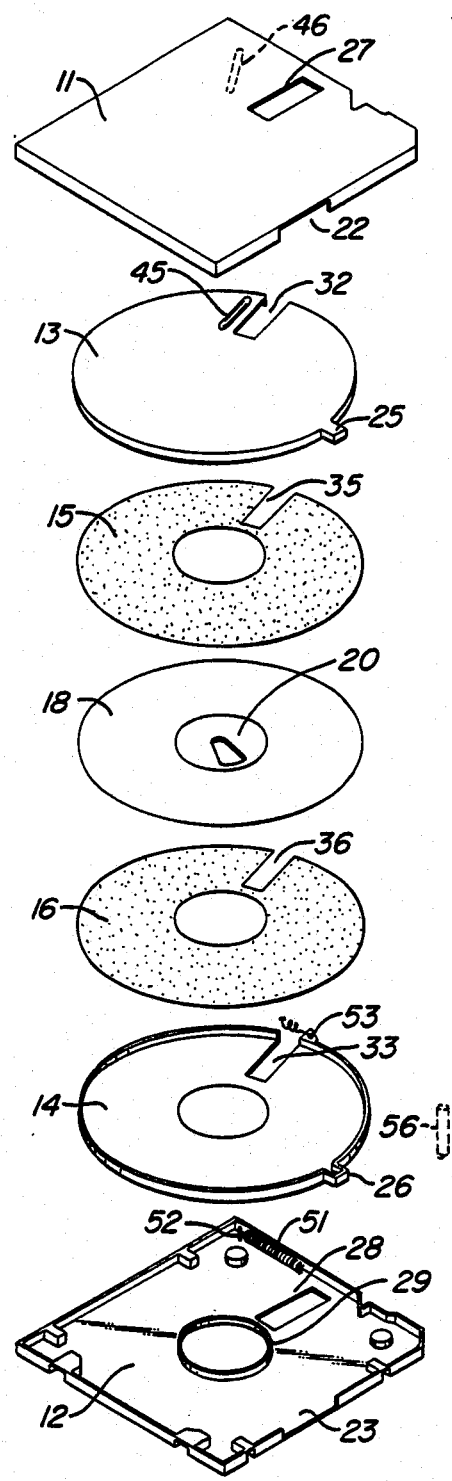
FIG.__1.

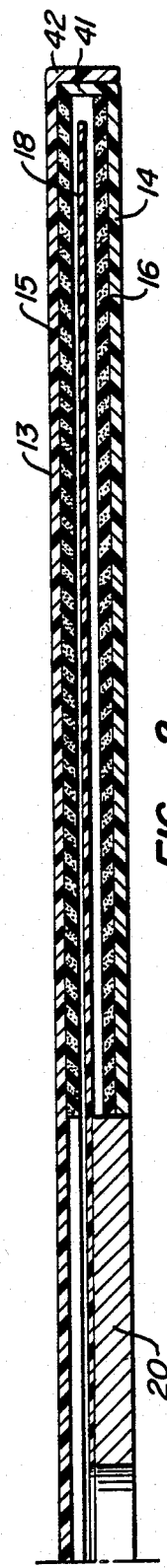
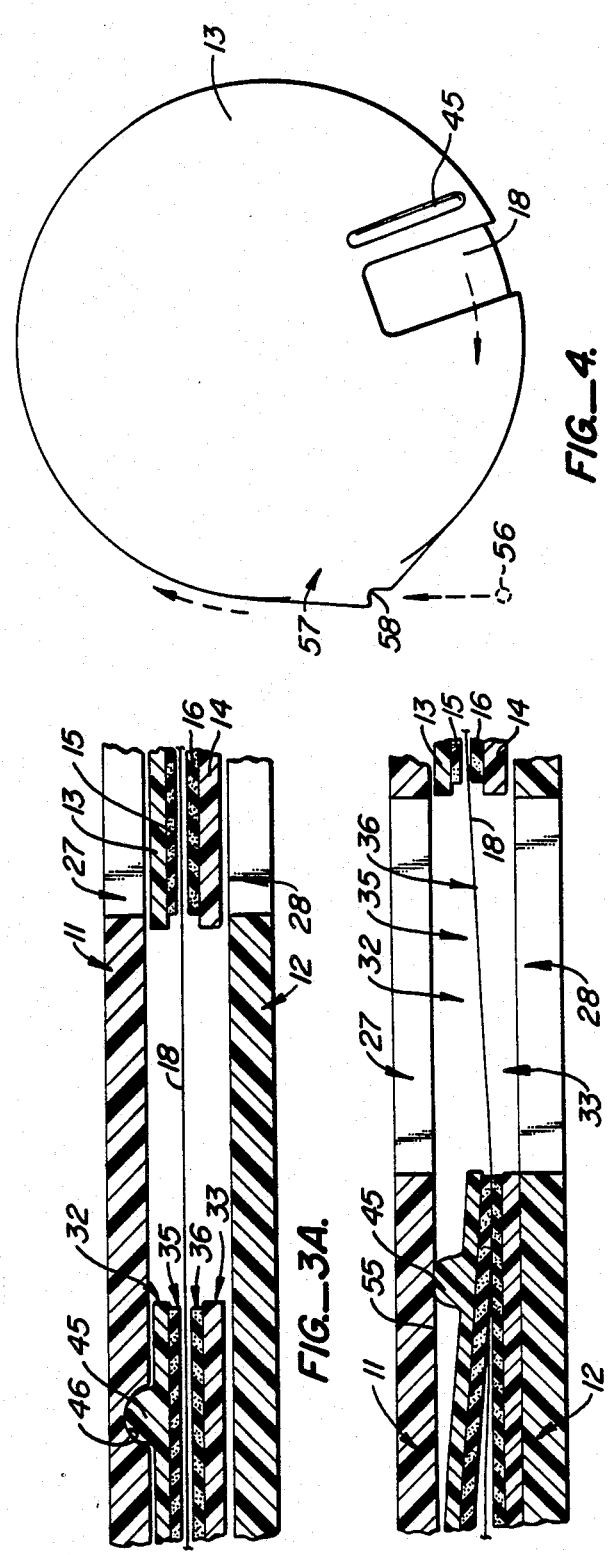
FIG._2.
FIG._4.
FIG._3A.
FIG._3B.

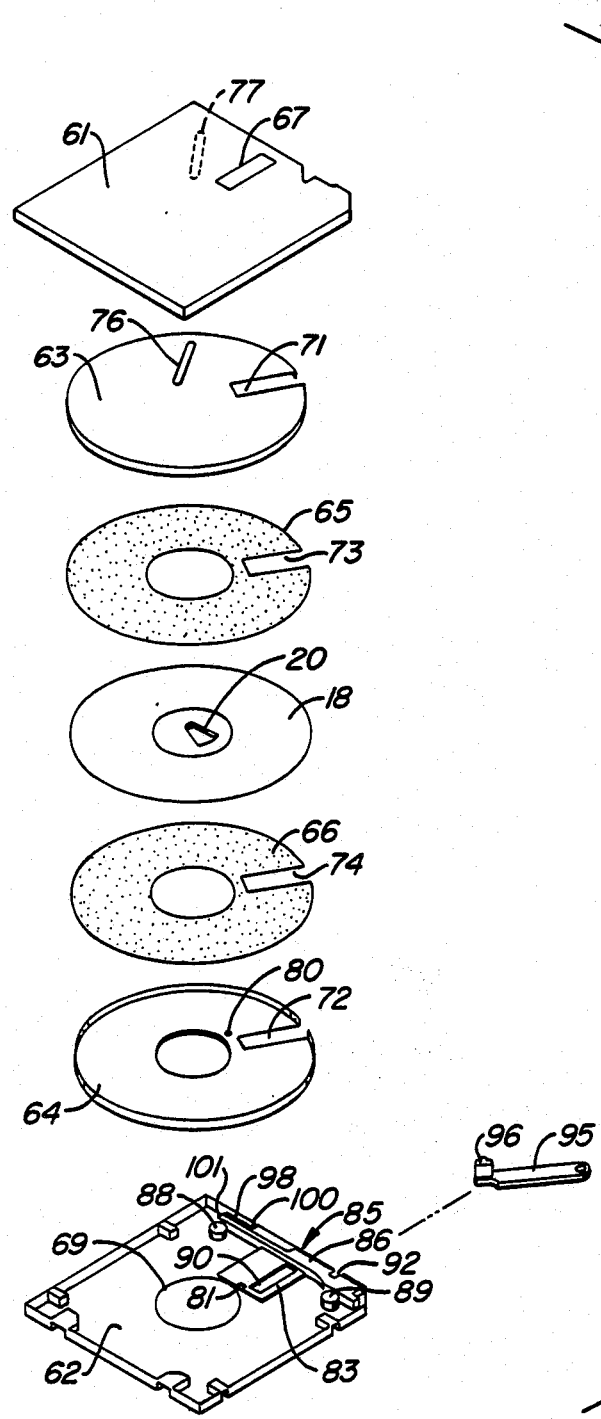
FIG._5.

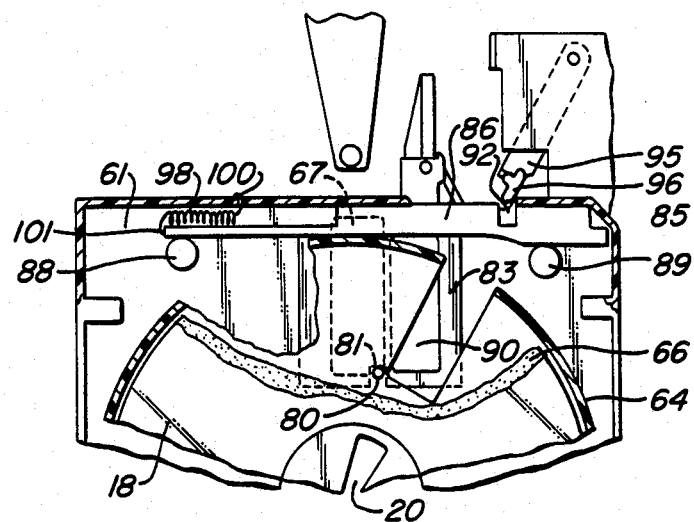
FIG._6A.
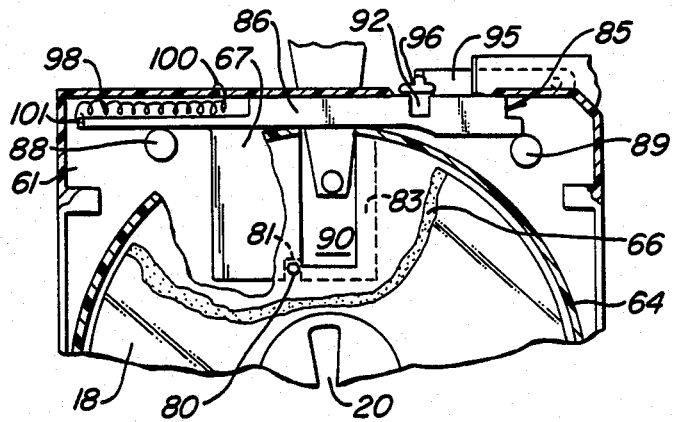
FIG._6B.

MICRO-FLOPPY DISKETTE WITH INNER CONTAINMENT SYSTEM

BACKGROUND OF THE INVENTION

This invention relates to flexible recording diskettes used for the storage of data in computer systems.

Flexible diskettes, commonly termed floppy disks, are commonly used for data storage in connection with computer systems. A typical flexible diskette includes a flexible annular recording disk rotatably encapsulated in a soft flexible jacket. The jacket is normally provided with a pair of aligned central apertures to permit the inner periphery of the recording disk to be clamped to the rotating spindle of an associated disk drive. In addition, the jacket is also typically provided with a pair of elongated radially extending apertures to afford access to the annular recording band on one or both sides of the flexible disk, so that a transducer and pressure pad (in a single-sided drive) or a pair of co-acting transducers (in a double-sided drive) may contact the surface of the disk during data storage or retrieval. Further, a pair of substantially annular wiping liners are typically adhered to the inner jacket surfaces to remove contaminant particles from the disk surfaces as the disk revolves within the jacket. To assist in this wiping action, the associated disk drive is typically provided with a pressure shoe or equivalent arrangement which acts on one or both outer surfaces of the diskette jacket to press the wiping material against the disk surface with sufficient force to promote the wiping action without substantially increasing the sliding friction between the disk surface and the inner liner material, i.e., without adversely affecting the ability of the disk to rotate within the jacket.

For reliability in performance, it is highly important that the position of the disk recording surface relative to the disk drive transducer, termed the disk operating plane, be predictable to a high degree. Consequently, well-designed disk drives for flexible diskettes include mechanical elements which serve to define the disk operating plane. In some disk drives, these elements include a stable reference surface and a mechanical shoe for biasing the diskette onto the reference surface.

Although originally designed with a diameter of 8", the second generation of commercially popular flexible diskettes was designed with a diameter of 5¼". This trend toward decreasing diametral dimensions has continued to the third generation of flexible diskettes, which are designed with a diameter of 3½" or less. However, the reduction in size represented by the currently dimensioned micro-floppy diskette has aggravated some problems encountered with the grosser sized flexible diskettes and has introduced additional problems.

Due to the relatively small dimensions of the micro-floppy diskette, the track density required to provide reasonable storage capability has been increased from a maximum of about 100 tracks per inch for the 5¼" diskette to 135 tracks per inch for the 3½" micro-floppy diskette. This increased track density requires either narrower tracks or more closely spaced tracks, which requires more stable disk media. Unfortunately, due to the relatively small size of the micro-floppy diskette, the potential for extreme thermal variations within the enclosure defined by the jacket has increased. In addition, the use of a metal hub secured to the inner margin of the disk media as the spindle mounting mechanism also increases the potential for thermal variations in the disk media due to the high thermal conductivity of the hub material as well as the intimate coupling with the disk.

Another problem aggravated by the reduction in size represented by the micro-floppy disk is that of particle contamination within the diskette jacket and handling damage to the disk media. Since the micro-floppy diskette is small enough to fit conveniently into a shirt or jacket pocket, it is much more portable than grosser sized disks and susceptible to more handling damage, and much more likely to be subject to particle contamination through the elongated access apertures.

The most popular micro-floppy diskette design at present attempts to reduce the contamination and handling damage problem by enclosing the disk in a relatively rigid plastic jacket provided with an externally mounted reciprocable shutter designed to cover the elongated access apertures when the disk is not in use. The use of the relatively rigid jacket, however, effectively precludes the use of an external pressure pad to promote the disk surface wiping function afforded by the liner material. In order to attempt to overcome this deficiency, a flexible tab is provided in the interior of the jacket to provide a biasing force between the inner jacket surface and the liner surface to attempt to force the liner material against the disk surface. This arrangement, however, is markedly inferior to the external pressure pad arrangement noted above. The use of the reciprocable shutter, which is fabricated from metal, introduces another potential source of thermal instability to the disk media, given the high thermal conductivity of the shutter material. In addition, however, the external shutter, being substantially thicker than the disk jacket, introduces a source of potential damage to the precisely contoured transducer surfaces in the associated disk drive, when the diskette is inserted and removed from the drive. Moreover, the potential for contamination and handling damage still remains with this design, since the shutter may be manually reciprocated to the open position and, in one version of the design, the shutter is provided with an automatic locking mechanism which locks the shutter in the open position when manually operated.

Perhaps the greatest problem presently encountered with the current micro-floppy diskette design is that of disk operating plane variation. As noted above, in order to function in an optimum fashion, the disk media should ideally rotate in a plane that is well defined with respect to the position of the transducer in the associated disk drive. Any deviation from this ideal disk operating plane adversely affects the ability of the disk/transducer combination to reliably record and read data on and from the disk recording surface. With grosser sized diskettes, the disk operating plane could be well defined by means of an external pressure shoe or equivalent mechanism to deform the disk media through the flexible jacket just upstream of the transducer location, thereby ensuring the proper positioning of the disk media in the disk operating plane. Due to the use of the relatively rigid external jacket, however, this provision is not possible in the current design.

SUMMARY OF THE INVENTION

The invention comprises an improved micro-floppy diskette which offers improved resistance to thermal variations within the disk media enclosure, provides an internal shutter mechanism for protecting the disk media from outside contamination and handling damage, provides improved disk surface wiping and exhibits superior disk operating plane performance.

According to the invention, the micro-flexible diskette includes an outer relatively rigid jacket composed of two complementary half portions, each having a radially extending access aperture, and an inner containment cup assembly comprising two complementary half portions which are bonded together around their peripheries to provide a disk enclosure. A wiping element is secured to the inner surface of each inner containment member, and the flexible disk is rotatably received within this inner containment cup assembly.

One of the inner cup half portions is provided with a positive detent member which cooperates with a mating detent element provided on the inside of the adjacent outer jacket half portion. Both portions of the inner containment cup assembly and both wiping elements are provided with mutually aligned cut-out portions which align with the radially extending apertures in the outer jacket half portions when the diskette is installed in an associated disk drive. In all embodiments, the inner containment cup assembly is rotatably received within the outer jacket and is provided with a motion transfer portion designed to co-act with an engagement element in the associated disk drive to cause the inner containment cup assembly to rotate within the external jacket when the diskette is inserted and removed from the drive. The inner containment cup assembly functions as a closure shutter which seals the radially extending access apertures in the outer jacket in the closed position and which aligns all apertures when the diskette is in the open position. In a first embodiment, the motion transfer portion comprises an externally extending lug or notch formed in the inner cup assembly, which engages a stop member in the associated disk drive. In an alternate embodiment, the motion transfer portion comprises a coupler member which is engaged with a slider reciprocably arranged between the cup assembly and the inner surface of one of the outer jacket half portions. The slider is provided with an externally accessible actuation notch, which engages an operating link incorporated in the associated drive when the diskette is installed in the drive. Optionally, a spring closure member is coupled between the outer jacket and the inner containment cup assembly (in the first embodiment) or the slider (in the alternate embodiment) to automatically retract the assembly to the closed position.

In the preferred embodiment, the shutter detent comprises a radially extending protruding lug formed in the outer surface of one of the inner containment cup assembly members and a corresponding groove formed in the inner surface of the adjacent jacket member. When the cup assembly is in the closed position, the lug is engaged by the groove to provide a positive detent for the system. When the inner containment cup assembly is rotated away from the detent position, the lug bears against the inner surface of the adjacent jacket member causing the flexible inner containment member to deflect towards the disk media and deflect the media as well. This deflection occurs slightly upstream of the transducer access area so that the media, when rotating within the inner containment cup assembly, is dynamically deflected to a reference plane in an accurate manner.

Due to the multi-layer construction of the invention, a substantial thermal barrier is created about the disk media, which reduces thermal variations in the immediate vicinity of the disk. The substantial peripheral seal afforded by the inner containment cup assembly, coupled with the shutter action afforded by the assembly, provides a formidable barrier to the introduction of particle contaminants to the disk media enclosure volume and provides enhanced protection against handling damage. The positive detent mechanism contributes to this protection against contamination and handling damage, and also provides a repeatable substantially constant disk operating plane reference for the media just upstream of the access region of the diskette.

For a fuller understanding of the nature and advantages of the invention, reference should be had to the ensuing detailed description taken in conjunction with the accompanying drawings.

BRIEF DESCRIPTION OF THE DRAWINGS

FIG. 1 is an exploded perspective view of a first embodiment of the invention;

FIG. 2 is an enlarged sectional view taken through one-half of an assembled inner containment assembly of FIG. 1;

FIGS. 3A and 3B are enlarged sectional views taken through the detent and access aperture region of an assembled diskette according to FIG. 1 illustrating the shutter detent position and the shutter open/media deflection position, respectively;

FIG. 4 is a top plan view of an alternate embodiment of the inner containment cup assembly;

FIG. 5 is an exploded perspective view of an alternate embodiment of the invention employing an internal slider;

FIG. 6A is a plan view partially broken away of the inner cup assembly and the lower outer jacket half portion showing the slider in the closed position; and FIG. 6B is a plan view similar to FIG. 6A showing the slider in the alternate opened position.

DESCRIPTION OF THE PREFERRED EMBODIMENTS

Turning now to the drawings, FIG. 1 illustrates a first embodiment of the invention in exploded perspective form. As seen in this Fig. the micro-flexible diskette includes a relatively rigid jacket comprising an upper half-portion 11 and a lower half-portion 12; a relatively flexible inner containment cup assembly which includes an upper cup member 13, a lower cup member 14, an annular upper wiping liner 15, and an annular lower wiping liner 16; and a flexible disk 18 provided with a central hub 20 adapted to mate with the driving spindle of an associated disk drive (not shown).

The outer jacket members 11, 12 are preferably fabricated from molded plastic to a thickness of 0.030" maximum and are provided with confronting peripheral margins in order to provide a jacket enclosure volume when the two half-portions 11, 12 are bonded together at the abutting margins. Each jacket half-portion 11, 12 is provided with a cut-out slot 22, 23 in order to afford an exit slot for a pair of lugs 25 and 26 formed in the inner containment cup assembly. Jacket half-portions 11, 12 are also provided with transducer access apertures 27, 28, and lower jacket half-portion 12 is provided with a central access aperture 29 to enable the hub 20 to be contacted by the driving spindle of the associated disk drive (not shown).

The inner containment cup members 13, 14 are provided with radially extending access cut-outs 32, 33, while inner wiping liners 15, 16 are similarly provided with radially extending access cut-outs 35, 36. The wiping liner members 15, 16 are secured to the inner surfaces of cup members 13, 14 in any suitable fashion, such as by means of an adhesive, pin bonding or the like, and the wiping liner members 15, 16 are so arranged within their respective cup members 13, 14 that cut-outs 32, 35, 36, and 33 are mutually aligned to expose the recording band on disk 18.

Upper and lower cup assembly members 13, 14 are mutually configured to provide a peripheral seal when the inner containment cup assembly is completed. As illustrated in FIG. 2, which is an enlarged sectional view taken through one-half of the completed inner containment cup assembly, lower cup member 14 has an upstanding peripheral edge portion 41 which is snugly received within the down turned peripheral edge portion 42 of upper cup member 13. This arrangement provides a sealed enclosure for the disk media 18 around the entire periphery of the inner containment cup assembly, with the exception of the small region at which the cut-outs 32, 33 are located. The joint between peripheral flange portions 41, 42 may be designed to provide a snap fit, may be sealed by a suitable adhesive or bonding agent, or may be thermally fused. Other equivalent sealing arrangements will occur to those skilled in the art.

With reference to FIGS. 1, 3A and 3B, a radially extending positive detent member 45 is formed in the upper surface of top cup member 13. A corresponding detent groove 46 is formed in the inner surface of upper jacket member 11. The relative positions of the detent elements 45, 46 are arranged such that positive detent occurs when the inner containment cup assembly is rotated in the counter-clockwise direction as viewed in FIG. 1 by a sufficient amount so that cut-outs 32, 35, 36, and 33 no longer register with access apertures 27, 28. The detent position is illustrated in the enlarged partial sectional view of FIG. 3A. As seen in this Fig., the detent lug 45 is received in detent groove 46, with cut-out portions 32, 35, 36, and 33 shielded from ambient by solid wall portions of upper and lower cup members 11, 12. As shown in FIG. 1, if desired a positive closing bias may be provided for the assembly by means of a spring 51 secured at one end to a fixed point 52 in the lower jacket member 12 and secured at the other end to an appropriate fixture point 53 on the lower cup member 14. Other bias mechanisms will occur to those skilled in the art.

While outer jacket members 11, 12 are relatively rigid, the inner containment cup members 13, 14, as well as wiping liner members 15, 16 and the disk 18 itself are all relatively flexible. Thus, when the inner containment cup assembly is rotated to the operative position in which the cut-outs 32, 35, 36, and 33 are all aligned with the jacket access apertures 27, 28, the detent lug 45 is in the position illustrated in FIG. 3B wherein the interference fit between the lug 45 and the inner wall surface 55 of the upper jacket member 11 causes at least the upper cup member 13, the associated liner 15 and the disk media 18 to deflect downwardly just upstream of the access area. As a consequence, that portion of the disk media 18 just upstream from the transducer access region is deflected downwardly by a predetermined amount equal to the thickness of the detent lug 45 to provide an internally established disk operating plane for the disk media 18. In addition, the liner elements 15, 16 are slightly compressed against the surfaces of disk media 18 to provide enhanced wiping action to remove surface contaminant particles.

The invention is assembled by securing the liner elements 15, 16 to the preformed inner cup members 13, 14, arranging disk media 20 intermediate the two subassemblies and sealing the peripheries of the cup members 13, 14. Thereafter, the inner containment cup assembly is arranged within the interior of one of the two jacket members 11, 12 with spring 51 (when provided) properly secured, after which the jacket members 11, 12 are secured together. Once assembled, in the embodiment shown in FIG. 1, insertion of the micro-flexible diskette into the associated disk drive causes the lugs 25, 26 to encounter a stationary pin 60 shown in phantom, which is mounted in the disk drive to the right of the entrance slot. As the diskette is advanced into the drive the inner containment cup assembly is rotated within the jacket by means of the interference between the pin 56 and the lugs 25, 26. In the fully inserted position, the recording band of the disk media 18 is exposed via the now aligned cut-outs 33, 35, 36, and 33 and access apertures 27, 28. When the diskette is removed from the drive, the bias spring 51 automatically retracts the inner containment cup assembly to the closed position. Where the bias spring 51 or its equivalent is not included, the inner containment cup assembly must be manually rotated to the shutter position.

FIG. 4 illustrates an alternate version of the inner containment cup assembly in which the lugs 25, 26 are supplanted by an enlarged peripheral segment 57 provided with a notch 64, which provides the same function as the lugs 25, 26 in combination with the disk drive pin 56.

FIGS. 5, 6A and 6B illustrate an alternate embodiment of the invention in which a separate slider is incorporated into the interior of the micro-floppy diskette and used to control the rotation of the inner containment cup assembly. With reference to FIG. 5, this embodiment includes a relatively rigid jacket comprising an upper half portion 61 and a lower half portion 62; a relatively flexible inner containment cup assembly which includes an upper cup member 63, a lower cup member 64, an annular upper wiping liner 65, and an annular lower wiping liner 66; and flexible disk 18 provided with central hub 20 adapted to mate with the driving spindle of the associated disk drive (not shown).

The outer jacket members 61, 62 are provided with confronting peripheral margins without the cutout slots 22, 23 of the FIG. 1 embodiment, but include transducer access apertures similar to apertures 27, 28. Only the aperture 67 in the upper jacket half portion 61 is visible in FIG. 5. Lower jacket half portion 62 is provided with central access aperture 69 to enable the hub 20 to be contacted by the driving spindle of the associated disk drive (not shown).

The inner containment cup members 63, 64 are provided with radially extending access cutouts 71, 72, while inner wiping liners 65, 66 are similarly provided with radially extending access cutouts 73, 74. The wiping liner members 65, 66 are secured to the inner surfaces of the cup members 63, 64 as in the FIG. 1 embodiment, and the wiping liner members 65, 66 are so arranged with their respective cup members 63, 64 that all cutouts are mutually aligned to expose the recording band on disk 18.

Upper and lower cup assembly members 63, 64 are mutually configured to provide the peripheral seal when the inner containment cup assembly is completed as described supra. Top cup member 63 is provided with the radially extending positive detent member 76 which mates with corresponding detent groove 77 formed in the inner surface of upper jacket half portion 61.

In order to provide the reciprocable rotary motion to the inner containment cup assembly, lower inner cup member 64 is provided with a downwardly depending coupler member 80, which may be either integrally formed with cup member 64 or may comprise a separate element secured to the outer wall of cup member 64 (such as a small post adhered to the lower external surface of cup member 64, a small pin riveted through the wall of cup member 64, or the like). Coupler member 80 engages a slot 81 in a flag portion 83 of a slider generally designated with reference numeral 85. Slider 85 includes a longitudinally extending main body member 86 from which the flag portion 83 extends radially inwardly toward the disk aperture 69. Slider 85 may comprise an integrally formed member fabricated from a suitable material, preferably moldable plastic.

Slider 85 is retained within the lower half jacket portion 62 by means of a pair of posts 88, 89 which extend upwardly from the inner surface of jacket half portion 62. Posts 88, 89 may be molded integrally with half portion 62 or may comprise separate members suitably adhered to this inner surface, as by gluing, thermal bonding, riveting and the like.

Flag portion 83 is provided with an access slot 90 located in such a manner as to align with the remaining access apertures when the slider 85 is translated to the open position described below.

Slider 85 includes an actuation notch 92 arranged to engage a pivotable actuator arm 95, which is normally found in the associated disk drive and which includes an actuating head 96 designed to engage notch 92 when the micro-floppy diskette is inserted into the drive. Slider 85 is normally biased to the closed position illustrated in FIG. 5 by means of a tension spring 98 anchored at a first end 100 to a fixed reference point within the diskette jacket and anchored at the other end 101 to a suitable reference point on slider 85.

In operation, in the normal closed position bias spring 98 maintains slider 85 in the extreme rightmost position illustrated in FIG. 6A in which the solid section of the flag portion 83 covers the access aperture in the lower jacket half portion 62. When the diskette is inserted into the drive a sufficient distance so that head 96 engages actuation notch 92, slider 85 is forceably reciprocated to the left as viewed in FIG. 6B to the open position in which the access aperture 90 in flag portion 83 aligns with remaining access apertures to expose the recording band on disk 18. When the diskette is removed from the drive, spring 98 biases slider 85 toward the right until the slider 85 is in the fully closed position.

As can now be appreciated, micro-flexible diskettes fabricated according to the teachings of the invention afford several advantages over the known micro-flexible diskette design. Firstly, by providing the inner containment cup assembly in combination with the outer relatively rigid jacket, a formidable thermal barrier is presented to shield the disk media 18 from extreme variations in ambient temperatures. In addition, the absence of any external shutter mechanism reduces the possibility of mechanical interference with the disk drive transducers as the diskette is being inserted and removed from the drive. Further, the sealed periphery of the inner containment cup assembly, when combined with the shutter action, affords a high degree of protection against contamination of the disk media by particulate matter as well as extensive protection against handling damage. Perhaps even more significantly, the provision of the detent lug 45 interference fit with the inner surface 55 of the outer jacket affords both enhanced wiping action on the disk surface and also provides a relatively accurate disk operating plane reference.

While the above provides a full and complete disclosure of the preferred embodiments of the invention, various modifications, alternate constructions, and equivalents may be employed without the departing from the true spirit and scope of the invention. For example, while the detent lug has been illustrated as an essentially semi-cylindrical integrally formed member mounted on the upper surface of upper cup member 13, other geometrical configurations may be suitable. Also, variations in the cross-sectional shape of the detent groove 46 may be employed, as desired, in order to provide a different detent feel or a gradual transition to the fully biased position illustrated in FIG. 3B. Moreover, other closure bias mechanisms than tension spring 51 may be employed. Further, while the edge closure arrangement for the inner cup assembly has been illustrated with the upstanding peripheral edge portion 41 received within the down turned peripheral edge portion 42, this configuration may be reversed, if desired. Therefore, the above description and illustrations should not be construed as limiting the scope of the invention which is defined by the appended claims.

What is claimed is:

1. A micro-flexible recording diskette comprising:
   an outer relatively rigid jacket having a pair of mutually aligned access apertures;
   a relatively flexible inner containment cup assembly received within said jacket, said assembly having a pair of cup members sealed about the periphery thereof and wiping means secured to the inner surfaces of said cup members, said cup members and said wiping means having mutually aligned cut-out portions; and
   a flexible disk received within said inner containment cup assembly;
   said cup assembly including externally accessible means for enabling said cup assembly to be rotated between a closed position in which said cut-out portions are shielded from ambient by solid portions of said jacket and an opened position in which said cut-out portions are aligned with said jacket access apertures;
   said jacket and said cup assembly further including mutually cooperable interference means for either biasing said disk into a reference plane within said jacket when said cup assembly is in the open position or alternatively enabling the disk to be maintained in a planar and non-biasing manner when said cup assembly is in the closed position.

2. The invention of claim 1 wherein said jacket includes a peripheral wall portion having a through aperture, and wherein said externally accessible cup assembly rotating means includes a lug extending through said jacket wall aperture.

3. The invention of claim 1 wherein said jacket includes a peripheral wall portion having a through aperture, and wherein said externally accessible cup assembly rotating means includes an enlarged peripheral portion extending through said jacket wall aperture.

4. The invention of claim 1 wherein each of said cup members has a peripheral edge surface, and wherein one of said peripheral edge surfaces is received within the remaining peripheral edge surface.

5. The invention of claim 1 wherein said mutually cooperable interference means comprises a protruding member located on the outer surface of one of said cup members arranged in surface contact with the inner surface of said jacket.

6. The invention of claim 5 wherein said protruding member comprises a radially extending lug.

7. The invention of claim 5 wherein said interference means further includes a detent groove formed in an inner surface of said jacket and arranged to receive said protruding member when said cup assembly is in the closed position.

8. The invention of claim 1 wherein said jacket includes a peripheral wall position having a through aperture, and wherein said externally accessible cup assembly rotating means includes a slider reciprocably received within the jacket, said slider having an externally accessible operating element positioned adjacent said aperture and an internal operating element coupled to said inner containment cup assembly.

9. The invention of claim 8 wherein said operating elements are notches formed in said slider.

10. The invention of claim 8 wherein said slider comprises an elongated main body member and a flag portion extending generally radially of said disk, said flag portion including an access aperture.

* * * * *